US009959179B1

(12) United States Patent
Yu et al.

(10) Patent No.: US 9,959,179 B1
(45) Date of Patent: May 1, 2018

(54) SYSTEMS AND METHODS FOR REPAIRING CORRUPTED DATA SEGMENTS

(71) Applicant: Veritas US IP Holdings LLC, Mountain View, CA (US)

(72) Inventors: Junheng Yu, Chengdu (CN); Chao Lei, Beijing (CN)

(73) Assignee: Veritas Technologies LLC, Mountain View, CA (US)

( * ) Notice: Subject to any disclaimer, the term of this patent is extended or adjusted under 35 U.S.C. 154(b) by 110 days.

(21) Appl. No.: 15/079,068

(22) Filed: Mar. 24, 2016

(51) Int. Cl.
*G06F 11/00* (2006.01)
*G06F 11/14* (2006.01)

(52) U.S. Cl.
CPC ...... *G06F 11/1469* (2013.01); *G06F 11/1451* (2013.01); *G06F 2201/805* (2013.01); *G06F 2201/84* (2013.01)

(58) Field of Classification Search
CPC .......................... G06F 11/1469; G06F 11/1451
See application file for complete search history.

(56) References Cited

U.S. PATENT DOCUMENTS

| | | | |
|---|---|---|---|
| 7,913,114 B2 | 3/2011 | Leppard | |
| 8,904,137 B1* | 12/2014 | Zhang | G06F 17/30135 711/165 |
| 9,104,622 B2 | 8/2015 | Anglin | |
| 2007/0245083 A1* | 10/2007 | Margolus | G06F 11/1096 711/114 |
| 2014/0298087 A1* | 10/2014 | Li | G06F 11/1469 714/6.11 |
| 2015/0012503 A1 | 1/2015 | Akirav et al. | |
| 2015/0033063 A1* | 1/2015 | Mills | G06F 11/2094 714/6.3 |
| 2015/0254144 A1* | 9/2015 | Pantel | G11B 20/1252 360/48 |

OTHER PUBLICATIONS

Xianbo Zhang, et al.; Systems and Methods for Prefetching Subsequent Data Segments; U.S. Appl. No. 13/961,685, filed Aug. 7, 2013.

* cited by examiner

*Primary Examiner* — Michael Maskulinski
*Assistant Examiner* — Katherine Lin
(74) *Attorney, Agent, or Firm* — FisherBroyles LLP

(57) ABSTRACT

The disclosed computer-implemented method for repairing corrupted data segments may include (1) detecting a corrupted data segment in a backup stored in a data storage system, (2) identifying at least one additional backup stored in the data storage system that exceeds a predetermined threshold for probability of comprising an uncorrupted version of the corrupted data segment, (3) matching at least a portion of a data segment in the additional backup with at least a portion of a data segment adjacent to the corrupted data segment in the backup, (4) locating, at least in part by examining data adjacent to the matched data segment in the additional backup, the uncorrupted version of the corrupted data segment, and (5) repairing the corrupted data segment in the backup by using the uncorrupted version of the corrupted data segment located in the additional backup. Various other methods, systems, and computer-readable media are also disclosed.

17 Claims, 7 Drawing Sheets

SYSTEMS AND METHODS FOR REPAIRING CORRUPTED DATA SEGMENTS

BACKGROUND

In an era of constant connectivity, an inability to efficiently create and maintain backups of important data can be a severe liability. Computing devices are prone to a wide variety of both temporary and fatal errors, and even temporary losses of data or services may be devastating to enterprises. The ability to maintain accurate and stable backups is crucial to enterprises that wish to maintain consistent services. While it is also important to have the ability to quickly create and copy backups and to quickly retrieve data from backups, none of that matters if the data within the backup is corrupted and unusable. Many backup systems reduce the problem of corrupted data by keeping multiple copies of each stored item of data. However, one corrupted copy of backup data can still cause trouble if that copy is not quickly repaired.

Many traditional backup systems store data in segments. These traditional backup systems may repair corrupted segments by searching for uncorrupted copies of the corrupted segment and replacing the corrupted data with intact data from the uncorrupted copy. However, many traditional systems may rely on fixed-width deduplication algorithms that have difficulty locating copies of segments that have become offset from their original position and no longer perfectly match other copies of the same segment. Accordingly, the instant disclosure identifies and addresses a need for additional and improved systems and methods for repairing corrupted data segments.

SUMMARY

As will be described in greater detail below, the instant disclosure describes various systems and methods for repairing corrupted data segments by using data from adjacent segments to locate corresponding uncorrupted data segments in other backups, even when the corrupted data segment is offset and may not be fixable using fixed-width matching algorithms.

In one example, a computer-implemented method for repairing corrupted data segments may include (1) detecting a corrupted data segment in a backup stored in a data storage system, (2) identifying at least one additional backup stored in the data storage system that exceeds a predetermined threshold for probability of including an uncorrupted version of the corrupted data segment, (3) matching at least a portion of a data segment in the additional backup with at least a portion of a data segment adjacent to the corrupted data segment in the backup, (4) locating, at least in part by examining data adjacent to the matched data segment in the additional backup, the uncorrupted version of the corrupted data segment, and (5) repairing the corrupted data segment in the backup by using the uncorrupted version of the corrupted data segment located in the additional backup.

In some examples, detecting the corrupted data segment may include detecting an offset corrupted data segment. In these examples, an uncorrupted version of the offset corrupted segment may not be able to be located using a fixed-length deduplication algorithm.

In some examples, identifying at least one additional backup may include determining a container identifier of a container that includes the corrupted data segment and determining that at least one additional backup includes a container with the container identifier. Additionally or alternatively, identifying at least one additional backup may include (1) identifying a group of additional backups that exceeds the predetermined threshold for probability of including the uncorrupted version of the corrupted data segment, (2) ranking each backup within the additional backups according to at least one of stability and size, and (3) selecting the highest-ranked backup within the additional backups.

In some examples, matching the portion of the data segment in the additional backup with the portion of the data segment adjacent to the corrupted data segment in the backup may include creating a partial fingerprint of the data segment adjacent to the corrupted data segment in the backup and matching the partial fingerprint to a partial fingerprint of the data segment in the additional backup. Additionally or alternatively, locating the uncorrupted version of the corrupted data segment may include identifying a fingerprint of the uncorrupted version of the corrupted data segment stored in an index and attempting to match at least one portion of the data adjacent to the matched data segment in the additional backup with the fingerprint by examining each portion of the data in turn to determine whether the portion of the data matches the fingerprint. In one embodiment, the data segment adjacent to the corrupted data segment in the backup may be a data segment that was stored in the backup prior to the corrupted data segment being stored in the backup.

In one embodiment, a system for implementing the above-described method may include (1) a detection module, stored in memory, that detects a corrupted data segment in a backup stored in a data storage system, (2) an identification module, stored in memory, that identifies at least one additional backup stored in the data storage system that exceeds a predetermined threshold for probability of including an uncorrupted version of the corrupted data segment, (3) a matching module, stored in memory, that matches at least a portion of a data segment in the additional backup with at least a portion of a data segment adjacent to the corrupted data segment in the backup, (4) a location module, stored in memory, that locates, at least in part by examining data adjacent to the matched data segment in the additional backup, the uncorrupted version of the corrupted data segment, (5) a repair module, stored in memory, that repairs the corrupted data segment in the backup by using the uncorrupted version of the corrupted data segment located in the additional backup, and (6) at least one physical processor configured to execute the detection module, the identification module, the matching module, the location module, and the repair module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) detect a corrupted data segment in a backup stored in a data storage system, (2) identify at least one additional backup stored in the data storage system that exceeds a predetermined threshold for probability of including an uncorrupted version of the corrupted data segment, (3) match at least a portion of a data segment in the additional backup with at least a portion of a data segment adjacent to the corrupted data segment in the backup, (4) locate, at least in part by examining data adjacent to the matched data segment in the additional backup, the uncorrupted version of the corrupted data segment, and (5) repair the corrupted data segment in the backup by using the uncorrupted version of the corrupted data segment located in the additional backup.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
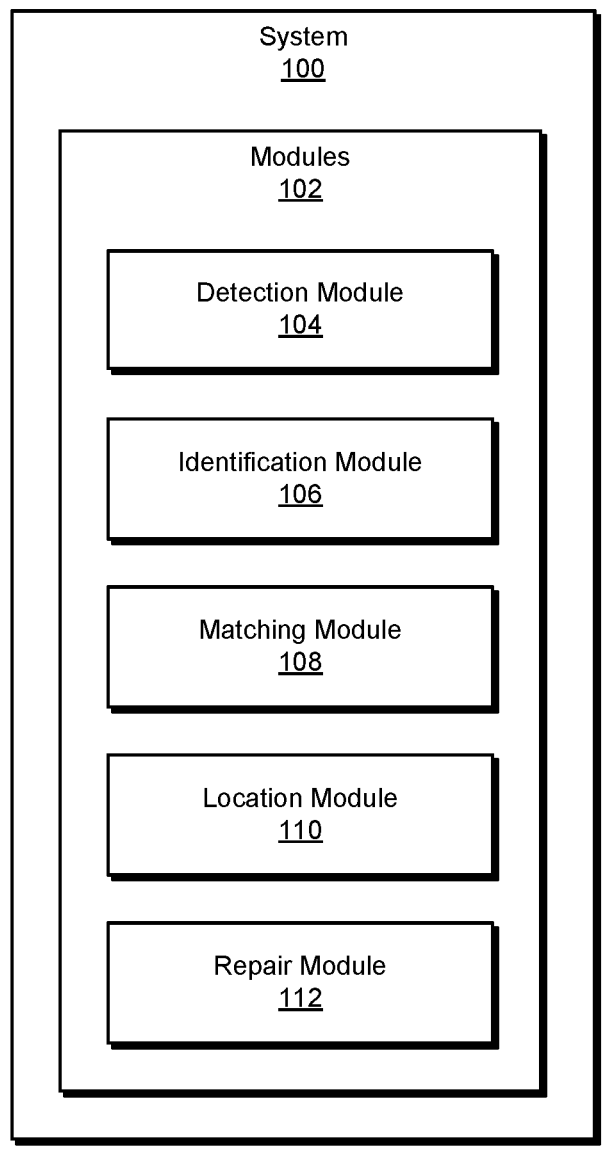
FIG. 1 is a block diagram of an exemplary system for repairing corrupted data segments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for repairing corrupted data segments. As will be explained in greater detail below, by locating an uncorrupted version of a corrupted data segment by matching data from adjacent segments, the systems described herein may repair corrupted data segments that cannot be repaired using fixed-length deduplication algorithms.

Figure 2:
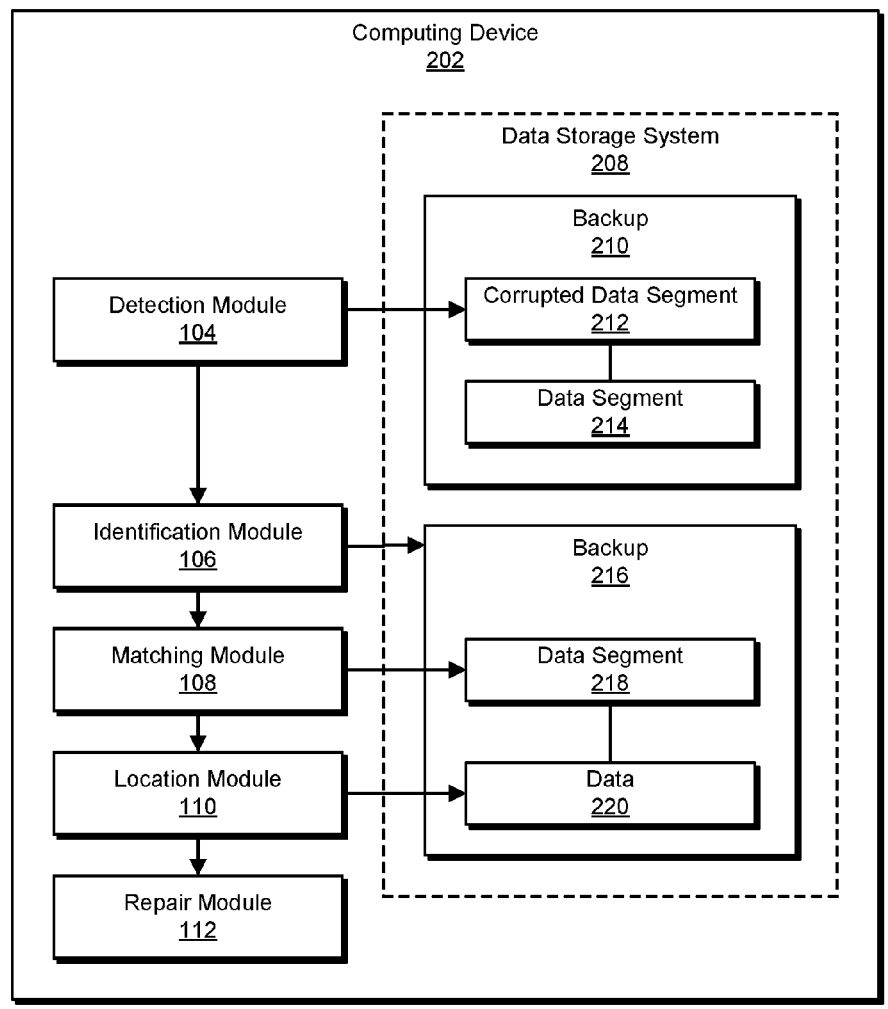
FIG. 2 is a block diagram of an additional exemplary system for repairing corrupted data segments.
Figure 4:
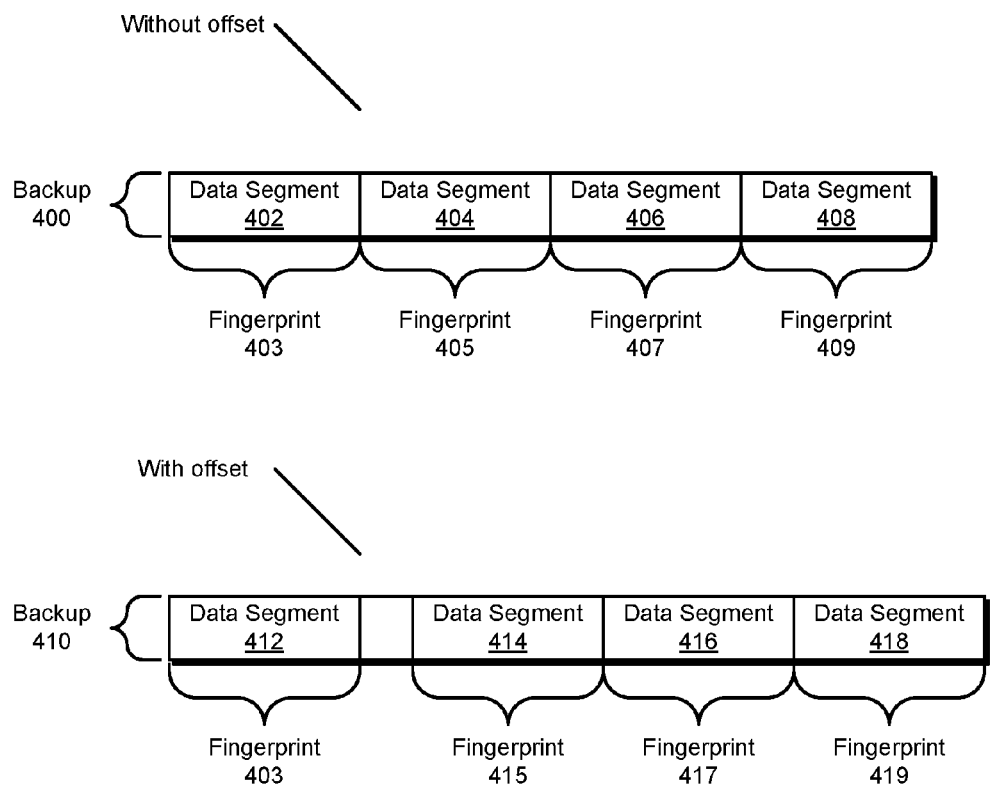
FIG. 4 is a block diagram of an exemplary set of data segments.
Figure 5:
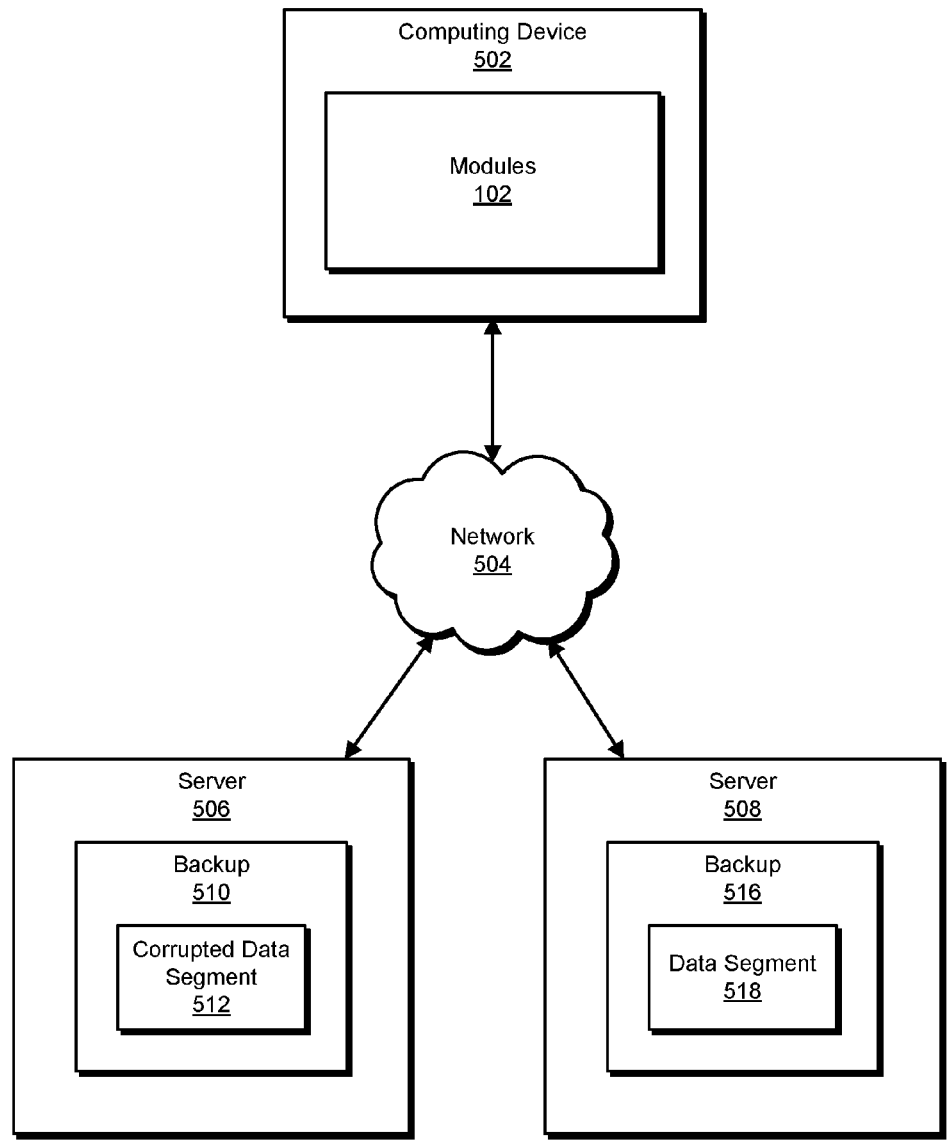
FIG. 5 is a block diagram of an exemplary computing system for repairing corrupted data segments.

The following will provide, with reference to FIGS. 1, 2, and 5, detailed descriptions of exemplary systems for repairing corrupted data segments. Detailed descriptions of corresponding computer-implemented methods will also be provided in connection with FIG. 3. Detailed descriptions of a set of exemplary data segments will be provided in connection with FIG. 4. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for repairing corrupted data segments. As illustrated in this figure, exemplary system 100 may include one or more modules 102 for performing one or more tasks. For example, and as will be explained in greater detail below, exemplary system 100 may include a detection module 104 that detects a corrupted data segment in a backup stored in a data storage system. Exemplary system 100 may additionally include an identification module 106 that identifies at least one additional backup stored in the data storage system that exceeds a predetermined threshold for probability of including an uncorrupted version of the corrupted data segment. Exemplary system 100 may also include a matching module 108 that matches at least a portion of a data segment in the additional backup with at least a portion of a data segment adjacent to the corrupted data segment in the backup. Exemplary system 100 may additionally include a location module 110 that locates, at least in part by examining data adjacent to the matched data segment in the additional backup, the uncorrupted version of the corrupted data segment. Exemplary system 100 may also include a repair module 112 that repairs the corrupted data segment in the backup by using the uncorrupted version of the corrupted data segment located in the additional backup. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 in FIG. 2, computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202. In one example, computing device 202 may be programmed with one or more of modules 102.

In one embodiment, one or more of modules 102 from FIG. 1 may, when executed by at least one processor of computing device 202, enable computing device 202 to repair corrupted data segments. For example, and as will be described in greater detail below, detection module 104 may detect a corrupted data segment 212 in a backup 210 stored in a data storage system 208. Identification module 106 may identify at least one backup 216 stored in data storage system 208 that exceeds a predetermined threshold for probability of including a data segment 218 that is an uncorrupted version of corrupted data segment 212. Once backup 216 has been identified, matching module 108 may match at least a portion of a data segment in backup 216 with at least a portion of data segment 214 in backup 210. Next, location module 110 may locate, at least in part by examining data 220 adjacent to the matched data segment in backup 216, data segment 218. Finally, repair module 112 may repair corrupted data segment 212 in backup 210 by using data segment 218 located in backup 210 216.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Figure 3:
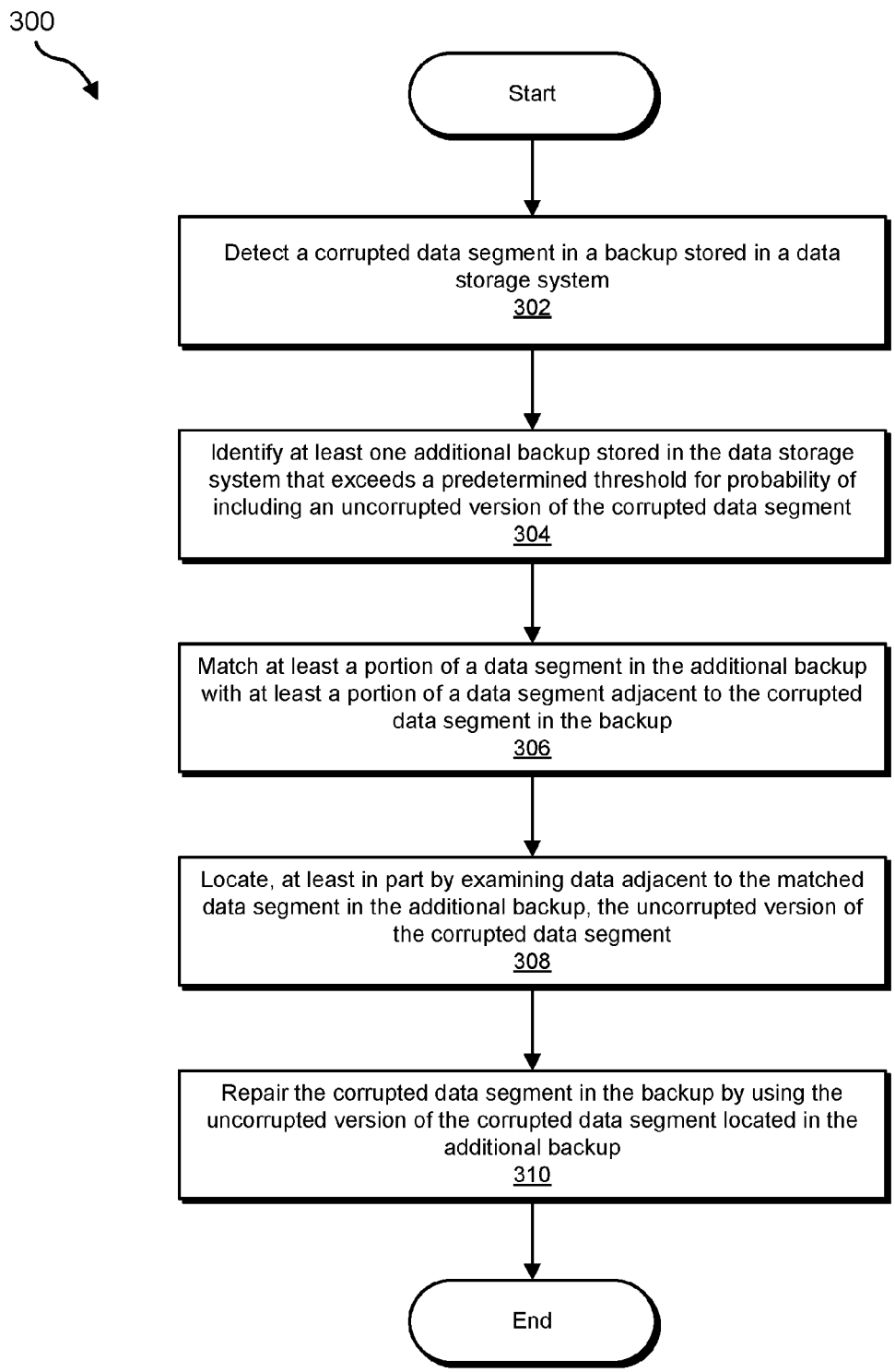
FIG. 3 is a flow diagram of an exemplary method for repairing corrupted data segments.

FIG. 3 is a flow diagram of an exemplary computer-implemented method 300 for repairing corrupted data segments. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may detect a corrupted data segment in a backup stored in a data storage system. For example, detection module 104 may, as part of computing device 202 in FIG. 2, detect corrupted data segment 212 in backup 210 stored in data storage system 208.

The term "data segment," as used herein, generally refers to any defined amount of data stored in a storage system. In some embodiments, a data segment may include a portion of a file and/or one or more variables. In some embodiments, a large number of data segments may be stored in a backup image.

The term "corrupted data segment," as used herein, generally refers to any data segment that includes any sort of error. In some examples, a corrupted data segment may be unreadable. In other examples, a corrupted data segment may be readable but may contain incorrect data.

The term "backup," as used herein, generally refers to any copy of an object, file, folder, operating system, application, and/or other computing object that is stored in a storage system. In some embodiments, the data in a backup may be divided into a number of data segments.

The term "data storage system" or "storage system," as used herein, generally refers to any system that stores data. In some embodiments, a data storage system may store backups. In one embodiment, a data storage system may include a deduplication system. In some embodiments, a data storage system may include multiple backup copies of the same data.

Detection module 104 may detect the corrupted data segment in a variety of ways. For example, detection module 104 may detect the corrupted data segment directly. In another embodiment, detection module 104 may receive information from another application indicating that the data segment is corrupted. In some embodiments, detection module 104 may routinely check data in the storage system for corruption.

In some examples, detection module 104 may detect an offset corrupted data segment. In these examples, an uncorrupted version of the offset corrupted segment may not be able to be located using a fixed-length deduplication algorithm. An offset data segment may not have the same fingerprint as a non-offset version of the same data segment. As illustrated in FIG. 4, a backup 400 may include data segments 402, 404, 406, and/or 408 with fingerprints 403, 405, 407, and/or 409, respectively. These data segments may not be offset. Meanwhile, a backup 410 may include data segments 412, 414, 416, and/or 418 that represent the same data as data segments 402, 404, 406, and/or 408, respectively. However, while data segment 412 may share a fingerprint with data segment 402, offset data segments 414, 416, and/or 418 may have different fingerprints than data segments 404, 406, and/or 408 and may instead have fingerprints 415, 417, and/or 419, respectively. In this example, if data segment 418 were to become corrupted, a fixed-length deduplication algorithm may not correctly locate data segment 408 as the uncorrupted version of the same segment due to the change in fingerprint caused by the offset.

Returning to FIG. 3, at step 304, one or more of the systems described herein may identify at least one additional backup stored in the data storage system that exceeds a predetermined threshold for probability of including an uncorrupted version of the corrupted data segment. For example, identification module 106 may, as part of computing device 202 in FIG. 2, identify backup 216 stored in data storage system 208 that exceeds a predetermined threshold for probability of including data segment 218.

Identification module 106 may identify the additional back up in a variety of ways. In some examples, identification module 106 may identify the additional backup by determining a container identifier of a container that includes the corrupted data segment and determining that the additional backup includes a container with the container identifier. In one example, identification module 106 may use a container map to identify every backup that includes a container with the same identifier as the container that includes the corrupted data segment.

In some embodiments, identification module 106 may identify at least one additional backup by identifying several additional backups that each exceed the predetermined threshold for probability of including the uncorrupted version of the corrupted data segment, ranking each backup according to stability and/or size, and selecting the highest-ranked backup. For example, if identification module 106 identifies three backups that may contain the corrupted data segment and two of the backups are very large while one is comparatively small, identification module 106 may select the smallest backup in order to speed up processing time in subsequent steps. In another example, identification module 106 may identify several backups and may select the least frequently modified backup in order to increases the chances of finding uncorrupted data.

Identification module 106 may determine the predetermined threshold for probability in a variety of ways. In one embodiment, identification module 106 may determine that any backup listed in a container identifier map as including a container with an identifier that matches the container identifier for the corrupted data segment has a high probability of including the corrupted data segment. In another embodiment, identification module 106 may determine that a backup that is identified as storing data about the same object, file, and/or application as the backup with the corrupted data segment has a high probability of including the corrupted data segment.

At step 306, one or more of the systems described herein may match at least a portion of a data segment in the additional backup with at least a portion of a data segment adjacent to the corrupted data segment in the backup. For example, matching module 108 may, as part of computing device 202 in FIG. 2, match at least a portion of a data segment in backup 216 with at least a portion of data segment 214 in backup 210.

Matching module 108 may match the data within the data segments in a variety of ways. For example, matching module 108 may match the portion of the data segment in the additional backup with the portion of the data segment adjacent to the corrupted data segment in the backup by creating a partial fingerprint of the data segment adjacent to the corrupted data segment in the backup and matching the partial fingerprint to a partial fingerprint of the data segment in the additional backup. The term "partial fingerprint," as used herein, typically refers to any representation of a portion of a data segment. For example, matching module 108 may hash a portion of the data segment adjacent to the corrupted data segment and compare that hash to a hash of a portion of a data segment in the additional backup.

In some embodiments, matching module 108 may compare data in the additional backup starting with data within the container with the same container identifier as the container that contains the corrupted data segment. Additionally or alternatively, matching module 108 may use an index and/or map that includes information about data segments to determine a likely spot to start attempting to match data.

In one embodiment, the data segment adjacent to the corrupted data segment in the backup may be a data segment that was stored in the backup prior to the corrupted data segment being stored in the backup. In some examples, the data segment adjacent to the corrupted data segment may have been stored immediately prior to the corrupted data segment being stored. By using an older data segment, the systems described herein may reduce chances that the adjacent data segment has also been corrupted.

At step 308, one or more of the systems described herein may locate, at least in part by examining data adjacent to the matched data segment in the additional backup, the uncorrupted version of the corrupted data segment. For example, location module 110 may, as part of computing device 202 in FIG. 2, locate, at least in part by examining data 220 adjacent to the matched data segment in backup 216, data segment 218.

Location module 110 may locate the uncorrupted version of the corrupted data segment in a variety of ways. In some embodiments, location module 110 may locate the uncorrupted version of the corrupted data segment by identifying a fingerprint of the uncorrupted version of the corrupted data segment stored in an index and attempting to match at least one portion of the data adjacent to the matched data segment in the additional backup with the fingerprint by examining each portion of the data in turn to determine whether the portion of the data matches the fingerprint. In one embodiment, location module 110 may start with the data immediately adjacent to the matched segment and work outwards from there.

In some embodiments, location module 110 may use fast data anchoring, a fast digest algorithm, convergent eigenvalues and/or segment metadata to locate the uncorrupted version of the corrupted segment. In one embodiment, location module 110 may execute in a separate sandbox from the deduplication engine in order to improve performance. In some embodiments, location module 110 may only scan data up to a predetermined distance away from the matched adjacent segment before returning a result that no matching data was found.

At step 310, one or more of the systems described herein may repair the corrupted data segment in the backup by using the uncorrupted version of the corrupted data segment located in the additional backup. For example, repair module 112 may, as part of computing device 202 in FIG. 2, repair corrupted data segment 212 in backup 210 by using data segment 218 located in backup 216.

Repair module 112 may repair the corrupted data segment in a variety of ways. For example, repair module 112 may replace the entire corrupted data segment with the uncorrupted version from the additional backup. In other examples, repair module 112 may replace a portion of the data in the corrupted data segment with data from the uncorrupted version of the data segment.

In some embodiments, the systems described herein may be located on different computing systems and/or servers. For example, as illustrated in FIG. 5, a computing device 502 may host modules 102 and/or may communicate with servers 506 and/or 508 via a network 504. In this example, server 506 may host a backup 510 that includes a corrupted data segment 512 and/or server 508 may host a backup 516 that includes a data segment 518 that is the uncorrupted version of corrupted data segment 512. In some embodiments, network 504 may represent a local area network and computing device 502, server 506, and/or server 508 may all be located in the same physical location. In other embodiments, network 504 may represent the Internet and computing device 502, server 506, and/or server 508 may be located remotely (i.e., on the cloud).

As described in connection with method 300 above, the systems and methods described herein may fetch healthy duplicate data for corrupt data segment repair across segment boundaries in a deduplication system. Upon detecting a corrupt data segment, the systems described herein may determine the container identifier of the container that contains the segment and then search for other backups that include containers with that same identifier. After locating one or more backups that include containers with the appropriate identifier, the systems described herein may rank the backups according to stability and/or size to determine which backup to check first. The systems described herein may then attempt to match a partial fingerprint of the segment immediately prior to the corrupted segment with a partial fingerprint of a segment in the found backup to determine where, if anywhere, in the found backup the segment that corresponds to the corrupted segment is located. If the systems described herein do not find a match for the partial fingerprint, the systems described herein may move to the next backup. When a match is found, the systems described herein may then search nearby data for a segment that matches a stored representation in an index for the corrupted data segment. After locating an uncorrupted version of the corrupted data segment, the systems described herein may then repair the corrupted data segment using the uncorrupted data. By searching for replacement data segments by using partial fingerprints of adjacent segments rather than fixed-length deduplication algorithms, the systems and methods described herein may efficiently repair corrupted data segments even in cases where some segments have become offset from their original position.

Figure 6:
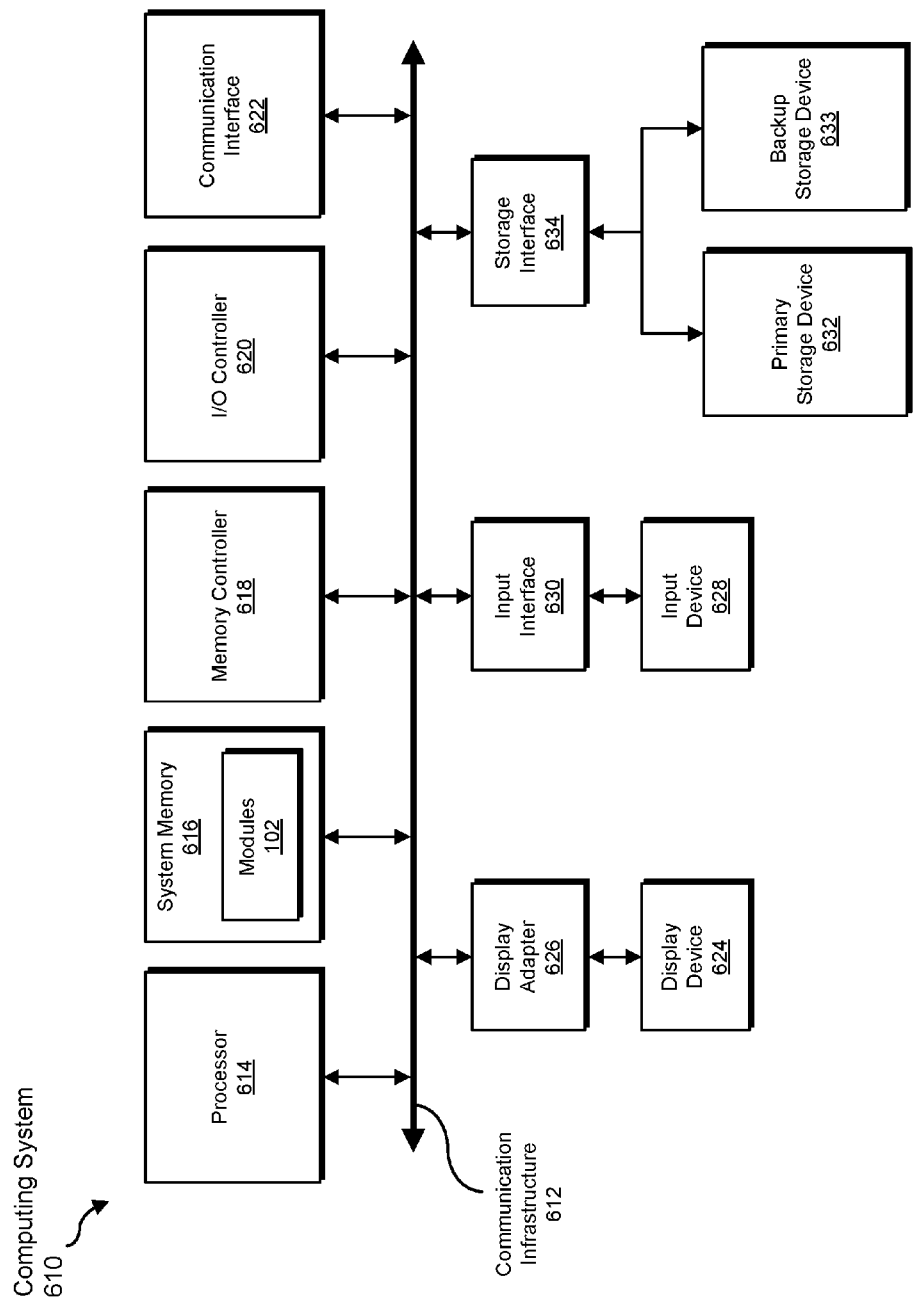
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
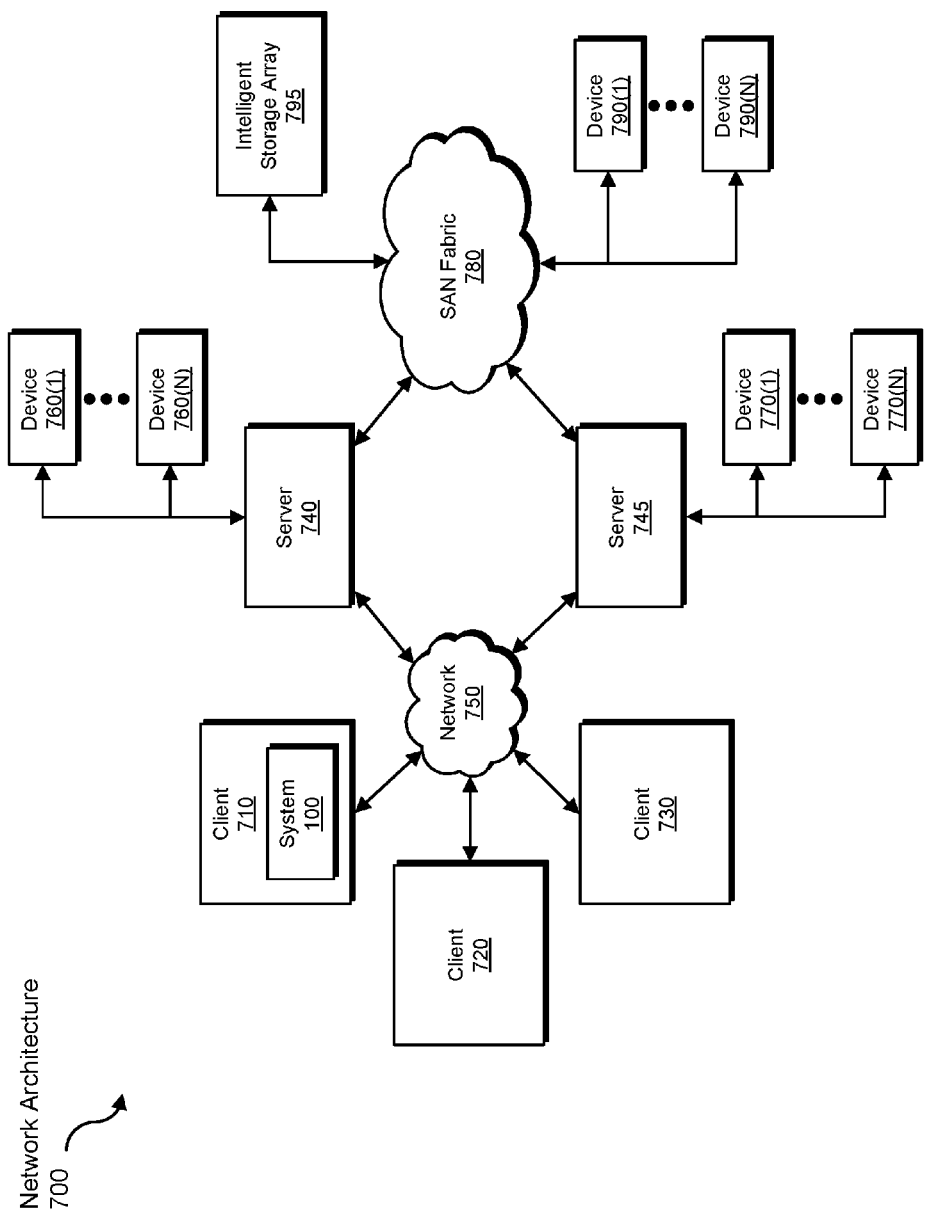
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for repairing corrupted data segments.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data to be transformed, transform the data by creating a fingerprint, output a result of the transformation to a matching technique, use the result of the transformation to locate similar data, and store the result of the transformation to a variable and/or file. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for repairing corrupted data segments, at least a portion of the method being performed by a computing device comprising at least one processor, the method comprising:
    detecting a corrupted data segment in a backup stored in a data storage system, wherein detecting the corrupted data segment comprises detecting an offset corrupted data segment, wherein an uncorrupted version of the offset corrupted segment cannot be located using a fixed-length deduplication algorithm;
    identifying at least one additional backup stored in the data storage system that exceeds a predetermined threshold for probability of comprising an uncorrupted version of the corrupted data segment;
    matching at least a portion of a data segment in the additional backup with at least a portion of a data segment adjacent to the corrupted data segment in the backup;
    locating, at least in part by examining data adjacent to the matched data segment in the additional backup, the uncorrupted version of the corrupted data segment;
    repairing the corrupted data segment in the backup by using the uncorrupted version of the corrupted data segment located in the additional backup.

2. The computer-implemented method of claim 1, wherein identifying the at least one additional backup comprises:
    determining a container identifier of a container that comprises the corrupted data segment;
    determining that the at least one additional backup comprises a container with the container identifier.

3. The computer-implemented method of claim 1, wherein identifying the at least one additional backup comprises:
    identifying a plurality of additional backups that exceeds the predetermined threshold for probability of comprising the uncorrupted version of the corrupted data segment;
    ranking each backup within the plurality of additional backups according to at least one of stability and size;
    selecting the highest-ranked backup within the plurality of additional backups.

4. The computer-implemented method of claim 1, wherein matching the portion of the data segment in the additional backup with the portion of the data segment adjacent to the corrupted data segment in the backup comprises:
    creating a partial fingerprint of the data segment adjacent to the corrupted data segment in the backup;
    matching the partial fingerprint to a partial fingerprint of the data segment in the additional backup.

5. The computer-implemented method of claim 1, wherein locating the uncorrupted version of the corrupted data segment comprises:
    identifying a fingerprint of the uncorrupted version of the corrupted data segment stored in an index;
    attempting to match at least one portion of the data adjacent to the matched data segment in the additional backup with the fingerprint by examining each portion of the data in turn to determine whether the portion of the data matches the fingerprint.

6. The computer-implemented method of claim 1, wherein the data segment adjacent to the corrupted data segment in the backup comprises a data segment that was stored in the backup prior to the corrupted data segment being stored in the backup.

7. A system for repairing corrupted data segments, the system comprising:
    a detection module, stored in memory, that detects a corrupted data segment in a backup stored in a data storage system, wherein the detection module detects the corrupted data segment by detecting an offset corrupted data segment, wherein an uncorrupted version of the offset corrupted segment cannot be located using a fixed-length deduplication algorithm;
    an identification module, stored in memory, that identifies at least one additional backup stored in the data storage system that exceeds a predetermined threshold for probability of comprising an uncorrupted version of the corrupted data segment;
    a matching module, stored in memory, that matches at least a portion of a data segment in the additional backup with at least a portion of a data segment adjacent to the corrupted data segment in the backup;
    a location module, stored in memory, that locates, at least in part by examining data adjacent to the matched data segment in the additional backup, the uncorrupted version of the corrupted data segment;
    a repair module, stored in memory, that repairs the corrupted data segment in the backup by using the uncorrupted version of the corrupted data segment located in the additional backup;
    at least one physical processor configured to execute the detection module, the identification module, the matching module, the location module, and the repair module.

8. The system of claim 7, wherein the identification module identifies the at least one additional backup by:
    determining a container identifier of a container that comprises the corrupted data segment;

determining that the at least one additional backup comprises a container with the container identifier.

9. The system of claim 7, wherein the identification module identifies the at least one additional backup by:
   identifying a plurality of additional backups that exceeds the predetermined threshold for probability of comprising the uncorrupted version of the corrupted data segment;
   ranking each backup within the plurality of additional backups according to at least one of stability and size;
   selecting the highest-ranked backup within the plurality of additional backups.

10. The system of claim 7, wherein the matching module matches the portion of the data segment in the additional backup with the portion of the data segment adjacent to the corrupted data segment in the backup by:
    creating a partial fingerprint of the data segment adjacent to the corrupted data segment in the backup;
    matching the partial fingerprint to a partial fingerprint of the data segment in the additional backup.

11. The system of claim 7, wherein the location module locates the uncorrupted version of the corrupted data segment by:
    identifying a fingerprint of the uncorrupted version of the corrupted data segment stored in an index;
    attempting to match at least one portion of the data adjacent to the matched data segment in the additional backup with the fingerprint by examining each portion of the data in turn to determine whether the portion of the data matches the fingerprint.

12. The system of claim 7, wherein the data segment adjacent to the corrupted data segment in the backup comprises a data segment that was stored in the backup prior to the corrupted data segment being stored in the backup.

13. A non-transitory computer-readable medium comprising one or more computer-readable instructions that, when executed by at least one processor of a computing device, cause the computing device to:
    detect a corrupted data segment in a backup stored in a data storage system, wherein the one or more computer-readable instructions cause the computing device to detect the corrupted data segment by detecting an offset corrupted data segment, wherein an uncorrupted version of the offset corrupted segment cannot be located using a fixed-length deduplication algorithm;
    identify at least one additional backup stored in the data storage system that exceeds a predetermined threshold for probability of comprising an uncorrupted version of the corrupted data segment;
    match at least a portion of a data segment in the additional backup with at least a portion of a data segment adjacent to the corrupted data segment in the backup;
    locate, at least in part by examining data adjacent to the matched data segment in the additional backup, the uncorrupted version of the corrupted data segment;
    repair the corrupted data segment in the backup by using the uncorrupted version of the corrupted data segment located in the additional backup.

14. The non-transitory computer-readable medium of claim 13, wherein the one or more computer-readable instructions cause the computing device to identify the at least one additional backup by:
    determining a container identifier of a container that comprises the corrupted data segment;
    determining that the at least one additional backup comprises a container with the container identifier.

15. The non-transitory computer-readable medium of claim 13, wherein the one or more computer-readable instructions cause the computing device to identify the at least one additional backup by:
    identifying a plurality of additional backups that exceeds the predetermined threshold for probability of comprising the uncorrupted version of the corrupted data segment;
    ranking each backup within the plurality of additional backups according to at least one of stability and size;
    selecting the highest-ranked backup within the plurality of additional backups.

16. The non-transitory computer-readable medium of claim 13, wherein the one or more computer-readable instructions cause the computing device to match the portion of the data segment in the additional backup with the portion of the data segment adjacent to the corrupted data segment in the backup by:
    creating a partial fingerprint of the data segment adjacent to the corrupted data segment in the backup;
    matching the partial fingerprint to a partial fingerprint of the data segment in the additional backup.

17. The non-transitory computer-readable medium of claim 13, wherein the one or more computer-readable instructions cause the computing device to locate the uncorrupted version of the corrupted data segment by:
    identifying a fingerprint of the uncorrupted version of the corrupted data segment stored in an index;
    attempting to match at least one portion of the data adjacent to the matched data segment in the additional backup with the fingerprint by examining each portion of the data in turn to determine whether the portion of the data matches the fingerprint.

* * * * *